United States Patent Office 3,062,592
Patented Nov. 6, 1962

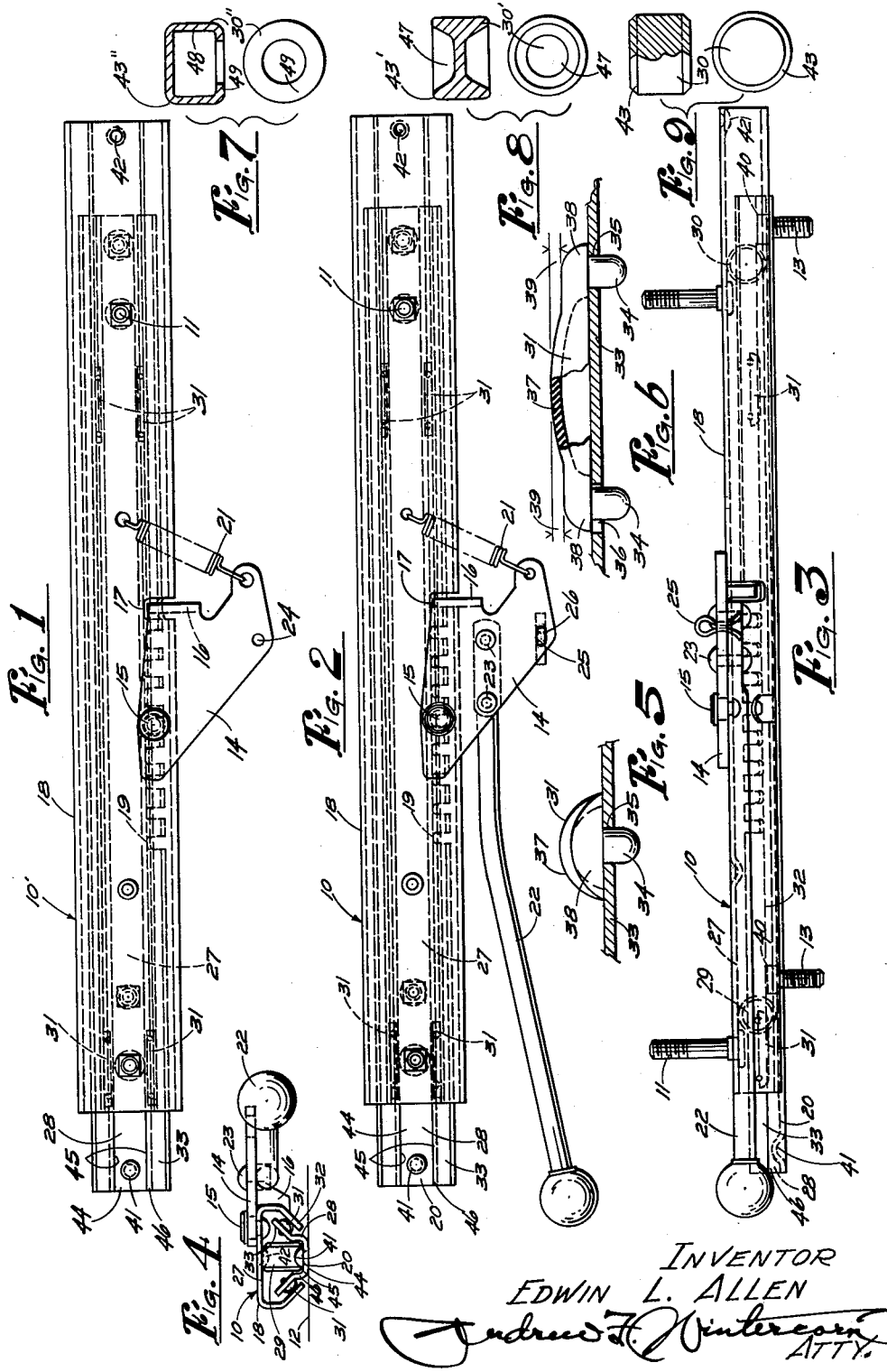

3,062,592
SEAT SLIDE
Edwin L. Allen, Rockford, Ill., assignor, by mesne assignments, to Atwood Vacuum Machine Company, Rockford, Ill., a corporation of Illinois
Filed June 13, 1960, Ser. No. 35,815
12 Claims. (Cl. 308—3.6)

This invention relates to seat slide structures for use with adjustable seats for vehicles such as automobiles.

The principal object of my invention is to provide a preloaded seat slide structure utilizing cylindrical rollers for line contact anti-friction rolling action between upper and lower channels, and incorporating elongated strips of nylon between the longitudinally extending oppositely inclined flanges on the upper and lower channels to eliminate lateral and vertical chuck or wobble by their line contact sliding engagement between these flanges, the nylon strips being specially designed to give ease and smoothness of operation and freedom from any likelihood of the parts tending to bind, even if there is an appreciable variation in thickness of the sheet metal of the channel members, as is found to be inevitable in quantity production of seat slides.

In the present seat slide structure there are preferably two fairly large cylindrical rollers disposed between the upper and lower channels at opposite ends and limited in their travel in a conventional manner so as to limit the extent of seat adjustment, and adjacent each of these rollers are two elongated strips of nylon or the like affixed to the bottom of the upwardly inclined outwardly projecting flanges on opposite sides of the lower channel for sliding engagement on top of the downwardly inclined inwardly projecting flanges provided on opposite sides of the upper channel so as to eliminate lateral and vertical chuck or wobble.

The preloading of the seat slide structure is accomplished by utilizing channels made of sheet metal with the requisite inherent springiness and forcing the rollers between the upper and lower channels thereof, causing appreciable deflection of the flanges as they are spread apart to admit the rollers, the rollers being thereby maintained under a compressive load at all times, thereby further insuring the elimination of rattle and vertical chuck or wobble. In addition, the elongated strips of nylon or the like are especially constructed, as hereinafter described to provide a predetermined limited amount of compressibility whereby not only to facilitate assembling the seat slide structure in the manner described when the sheet metal utilized in the channels is of a specified thickness or within a few thousands of an inch of that thickness, but also enable assembling the seat slide structure when the sheet metal of the channels is unusually oversize and would otherwise make assembling of the seat slide structure impossible were it not for this predetermined amount of give in the nylon strips.

The invention is illustrated in the accompanying drawing, in which—

FIGS. 1 and 2 are plan views of the left hand and right hand seat slide structures for an automobile seat made in accordance with my invention;

FIGS. 3 and 4 are a side view and an end view, respectively, of the seat slide structure of FIG. 2;

FIGS. 5 and 6 are enlarged sectional details of one of the elongated nylon strips shown approximately twice size to better illustrate their construction and how they are mounted on the flanges of the lower channel, and FIGS. 7, 8 and 9 are details showing three different kinds of cylindrical rollers suitable for use in the present seat slide structures.

Similar reference numerals are applied to corresponding parts throughout the views.

The seat slide structure embodying the improvements of my invention is indicated generally by the reference numeral 10 in FIGS. 2, 3 and 4 and a similar one is indicated generally by the reference numeral 10' in FIG. 1, two of these structures being provided in connection with each seat, attached to the bottom of the seat by means of bolts 11 or in any other suitable manner and secured to and supported upon the floor 12 on suitable brackets to which the seat slide structures are secured by means of other bolts 13. Both seat slide structures of a pair have latches 14 pivoted thereon by means of rivets 15 so that a latch tooth 16 operating in a notch 17 in one side of the upper channel member 18 can lock the seat in any one of a plurality of positions of fore and aft adjustment when the tooth 16 engages in one of a series of notches 19 provided in one side of the lower channel member 20, in the usual way. Both latches 14 are urged under the action of coiled tension springs 21 toward locked position and are arranged to be swung outwardly by inward movement of a manually operable lever 22 riveted, as at 23, to the latch 14 on seat slide structure 10 for operation conveniently by the driver, in the usual way. A hole 24 is provided in the latch 14 on seat slide structure 10' and a cotter pin 25 is provided in a similar hole 26 provided in the latch 14 on seat slide structure 10 so that a cross-link (not shown) may be pivotally connected at its opposite ends with these two latches 14 to operate them together in the usual way.

The upper and lower slide members 18 and 20 are of rolled or stamped sheet metal construction for lightness and economy and also strength and rigidity, and are formed to provide opposing channels 27 and 28 in which two cylindrical bearing rollers 29 and 30 operate to maintain the slide members in a normal spaced relationship, without however assuming the function of guiding the upper slide member for movement in a straight line relative to the lower slide member, this latter function being performed by two elongated strips 31 cooperating with each of the rollers 29 and 30. The strips 31 are slidable between oppositely inclined flanges 32 and 33, flanges 32 being provided on opposite sides of the upper slide member 18, extending lengthwise thereof, and inclined downwardly and inwardly, and flanges 33 being provided on opposite sides of the lower channel member 20 lengthwise thereof and inclined upwardly and outwardly, the inclination being at an angle of approximately 45° to a vertical, as clearly appears in FIG. 4. The strips 31 have cylindrical dowel pins projections 34 provided on opposite ends thereof, one of which fits snugly in a round hole 35 provided therefor in the flange 33, and the other fitting loosely in a slot or enlarged hole 36 provided in the flange 33 in longitudinally spaced relation to the hole 35, the slot 36 having its elongation in a direction longitudinally of the flange 33, and hence lengthwise with respect to the strip 31, whereby to permit a predetermined amount of elongation of the strip 31 when the hollow arcuately humped middle cushion portion 37 of the strip is subjected to compression. The end portions 38 of each strip are solid, as best illustrated in FIG. 6, and serve more or less positively to limit the compression of the strips to the extent of the dimension indicated at 39 in FIG. 6, this dimension being enough to allow for more than the anticipated run-out so far as variation in thickness of sheet metal supplied for the manufacture of the channel members 18 and 20 is concerned, and the compressible cushion portion 37 being resilient so as to cooperate with the inherent resilience or springiness in the sheet metal employed in the channel members 18 and 20 to maintain the rollers 29 and 30 under a compressive load at all times, and thereby eliminate rattle.

The heads 40 of bolts 13 serve as stops to limit rearward travel of the rollers 29 and 30 whereby to limit rearward travel of the upper channel 18 and accordingly limit rearward adjustment of the seat. A hump 41 in the front end of the lower channel 20 and a hump 42 in the rear end of the upper channel 18 serve as stops for rollers 29 and 30, respectively, to limit fore and aft adjustment of the seat. The channel 18 is shown in its rearward limit position in FIGS. 1, 2 and 3, and special attention is called to the fact that the front strips 31 are so located in flanges 33 in rearwardly spaced relation to the front end of the lower channel 20 that no portion of either of these strips is uncovered. The same is true regarding the location of the rear strips 31 in the forward extreme position of the upper channel 18. In that way there is eliminated the likelihood of the strips 31 having portions thereof shaved off by rubbing contact with the edges on the ends of the upper channel 18.

The rollers 29 and 30 are of the solid cylindrical steel form illustrated in FIG. 9 with bevelled edges 43 to insure running entirely on the flat top surface of the webs 44 of the bottom channel 20 and remain clear of the upwardly rounded edge portions 45 thereof where the metal is bent upwardly to form the side walls 46. A similar result is obtained when the rollers 29 and 30 are made like that shown at 30' in FIG. 8, this being a cold upset steel roller centrally dished on opposite sides, as indicated at 47, and having rounded edges 43' on the periphery to provide clearance with respect to the rounded edges 45 in the channel 20. A similar result is also obtainable when the rollers 29 and 30 are made like that shown at 30" in FIG. 7, from sheet metal by extrusion to provide the peripheral walls 47 and by swedging to form the open side 49. The rounded edges 43" on the periphery provide ample operating clearance with respect to the rounded edges 45 on the lower channel 20.

In operation, each seat slide structure is preloaded in the assembling thereof to make it as "tight" as necessary to forestall the likelihood of any chuck or wobble and consequent rattle developing in the use of the seat slide. The preloading is accomplished by the forming of the upper and lower sheet metal channels so that the flanges 32 on the upper channel 18 are initially at less than an angle of 45° with respect to the web of the upper channel 18, and it is only after the seat slide structure is assembled that these flanges 32 are disposed at an angle of 45° with respect to the horizontal plane of the web of channel 18. The same is true in regard to the flanges 33 on the lower channel 20. In other words, when the flanges 32 and 33 are flexed outwardly and inwardly, respectively, by forcing the rollers 29 and 30 into place between the upper and lower channels, the structure is thereby preloaded due mainly to the inherent resilience of the sheet metal and the consequent spring-back tendency thereof but due also to some extent to the resilience in the humped hollow cushion portions 37 of the nylon strips 31, and it should be clear that if the strips 31 were provided of solid form throughout to a standard height dimension, and would not, therefore, have the yield afforded at 37 in the present construction, but would be substantially incompressible throughout their length, a few thousands of an inch variation in thickness of the sheet metal provided for the channels 18 and 20, such as is inevitable in quantity production of the seat slides, would result in considerable variation in the ease of operation of the seat slide, and, in an extreme case, would make the seat slides operate too hard to pass inspection and be acceptable to the customer, and could conceivably even make it impossible to assemble the seat slides. The line contact of rollers 29 and 30 transversely of the webs of the channels 18 and 20 combined with the line contact of the nylon strips 31 lengthwise of flanges 32 makes for lower unit bearing pressure and consequently increased durability of the seat slide structure, and the wear is so slight that it is never sufficient to allow chuck or wobble throughout the life of the seat slide structure, what little wear there is apt to be being amply compensated for by the preloading of the springy flanges 32 and 33 and the compressible resilient cushion portions 37 of the strips 31. Sufficient lubricant is supplied at the time of assembly to last the life of the seat slide structure to insure smooth, quiet and easy operation at all times. The nylon strips 31 are not affected by the lubricant.

It is believed the foregoing description conveys a good understanding of the objects and advantages of my invention. The appended claims have been drawn to cover all legitimate modifications and adaptations.

I claim:

1. A slide structure comprising a pair of parallel, relatively reciprocable, opposed, elongated metallic channel members, each having webs and opposed side walls, one of said channel members being narrower than the other and having flat outwardly projecting flexible resilient flanges in diverging relationship provided on its side walls longitudinally thereof, the other channel member being wider and having flat inwardly projecting flexible resilient flanges in converging relationship provided on its side walls longitudinally thereof and, in the telescoping of said members, being disposed outside the first mentioned flanges in substantially parallel spaced relationship thereto, anti-friction rolling bearing elements disposed between the webs of said telescoped channel members rollably supporting one member upon the other member, and elongated narrow strips of nonmetallic material disposed between and spreading said flanges to the aforesaid spaced relationship and having relatively thick and relatively non-compressible end portions fixed to the flanges on one of said members holding said strips disposed lengthwise thereof parallel to the direction of relative endwise movement of said members and having hollow relatively thin walled compressible portions of increased height intermediate the ends rounded transversely of the outer surface that engage the flanges on the other member so as to provide substantially line bearing contact on the flanges of the said other member for lower unit bearing pressure and easier sliding in the relative endwise movement of said members.

2. A slide structure comprising a pair of parallel relatively reciprocable, opposed, elongated metallic channel members, each having webs and opposed side walls, one of said channel members being narrower than the other and having flat outwardly projecting flexible resilient flanges in diverging relationship provided on its side walls longitudinally thereof, the other channel member being wider and having flat inwardly projecting flexible resilient flanges in converging relationship provided on its side walls longitudinally thereof and, in the telescoping of said members, being disposed outside the first mentioned flanges in substantially parallel spaced relationship thereto, anti-friction rolling bearing elements disposed between the webs of said telescoped channel members rollably supporting one member upon the other member, and elongated narrow strips of nonmetallic material disposed between and spreading said flanges to the aforesaid spaced relationship and fixed to the flanges on one of said members lengthwise thereof parallel to the direction of relative endwise movement of said members and rounded transversely of the outer surface that engage the flanges on the other member so as to provide substantially line bearing contact on the flanges of the said other member for lower unit bearing pressure and easier sliding in the relative endwise movement of said members, each elongated strip being of molded flexible resilient material and including a hollow compressible cushion portion intermediate the ends which is of increased height in relation to and projects from the plane of the end portions, the latter being solid and relatively non-compressible, whereby the end portions serve positively to limit compression of the intermediate hollow cushion portion.

3. A slide structure comprising a pair of parallel relatively reciprocable, opposed, elongated metallic channel members, each having webs and opposed side walls, one of said channel members being narrower than the other and having flat outwardly projecting flexible resilient flanges in diverging relationship provided on its side walls longitudinally thereof, the other channel member being wider and having flat inwardly projecting flexible resilient flanges in converging relationship provided on its side walls longitudinally thereof and, in the telescoping of said members, being disposed outside the first mentioned flanges in substantially parallel spaced relationship thereto, antifriction rolling bearing elements disposed between the webs of said telescoped channel members rollably supporting one member upon the other member, and elongated narrow strips of nonmetallic material disposed between and spreading said flanges to the aforesaid spaced relationship and fixed to the flanges on one of said members lengthwise thereof parallel to the direction of relative endwise movement of said members and rounded transversely of the outer surface that engage the flanges on the other member so as to provide substantially line bearing contact on the flanges of the said other member for lower unit bearing pressure and easier sliding in the relative endwise movement of said members, each elongated strip being of molded flexible resilient material and including a hollow compressible cushion portion intermediate the ends which is of increased height in relation to the end portions, the latter being solid and relatively non-compressible, whereby the end portions serve positively to limit compression of the intermediate hollow cushion portion, the strips being fixedly connected at one end to the flanges of one of said channel members but loosely connected to said flanges of said channel member at the other end so as to allow for endwise movement of the latter end with respect to said flanges in the compression of the cushion portions.

4. A slide structure as set forth in claim 1 wherein the endwise movement of said channel members with respect to one another is limited, and said strips are fixed to the flanges of one of said members in a predetermined inwardly spaced relationship to the ends thereof, the spacing being in such relationship to the range of endwise movement of said members that said strips remain overlapped by the flanges of the other member in both extreme positions of the channel members relative to one another.

5. As an article of manufacture, a molded slidable bearing strip of flexible resilient material comprising an elongated substantially horizontal narrow body of substantially uniform width that has both end portions relatively thick and solid and flat on the bottom and rounded on the top, the major portion of the intermediate length of said strip, which is flat on the bottom and rounded transversely on the top and of greater height than the end portions, being hollowed out on the bottom to provide an elongated relatively thin walled hollow cushion portion intermediate the ends, the compressibility of which is limited by the end portions.

6. An article of manufacture as set forth in claim 5, wherein the top of the elongated relatively thin walled hollow cushion portion is arched endwise.

7. An article of manufacture as set forth in claim 5, wherein the top of the elongated hollow cushion portion is arched endwise, the top wall of said cushion portion being of substantially uniform thickness throughout.

8. In combination, a flat support having a pair of spaced holes provided therein, one of which is larger than the other, and an elongated narrow compressible resilient bearing and cushioning strip mounted on said support having a flat bottom resting on said support and having dowel pin projections of substantially the same size on the flat bottom thereof at opposite ends, one of which is closely received in the smaller hole and the other of which is loosely received in the larger hole so as to allow give of one end portion of the strip endwise relative to the other end portion under transverse compression of the strip, said strip being of molded flexible resilient material, the opposite end portions of which carry said dowel pin projections and are solid and relatively non-compressible, and an intermediate elongated portion of the length of said strip being of increased height in relation to the end portions and hollowed out on the bottom for compressibility and cushioning action, whereby the end portions serve to limit the compressibility of the intermediate cushion portion.

9. The combination as set forth in claim 8, wherein the top of the intermediate portion of said strip is arched endwise between the end portions.

10. The combination as set forth in claim 8, wherein the top of the intermediate portion of said strip is arched endwise between the end portions, and the top wall of said cushion portion is of substantially uniform thickness throughout.

11. The combination set forth in claim 8, wherein the end portions of said strip are rounded transversely on the top thereof and wherein the intermediate higher cushion portion is also rounded transversely on the top thereof, whereby to provide substantially line contact when the top of the strip has engagement with a flat bearing surface.

12. The combination as set forth in claim 8, wherein the top of the intermediate portion of said strip is rounded transversely and is also arched endwise between the end portions.

References Cited in the file of this patent

UNITED STATES PATENTS

| 2,048,274 | Luby | July 21, 1936 |
| 2,757,051 | Wilmer et al. | July 31, 1956 |
| 2,759,773 | Wilmer et al. | Aug. 21, 1956 |
| 2,796,113 | Lyon et al. | June 18, 1957 |
| 2,840,139 | Ragsdale | June 24, 1958 |
| 2,919,744 | Tanaka | Jan. 5, 1960 |

FOREIGN PATENTS

| 1,193,165 | France | Apr. 27, 1959 |